US012122024B2

(12) United States Patent
Spencer, Jr.

(10) Patent No.: US 12,122,024 B2
(45) Date of Patent: Oct. 22, 2024

(54) CENTER DRIVE WRENCH

(71) Applicant: Don Mark Spencer, Jr., Owego, NY (US)

(72) Inventor: Don Mark Spencer, Jr., Owego, NY (US)

( * ) Notice: Subject to any disclaimer, the term of this patent is extended or adjusted under 35 U.S.C. 154(b) by 219 days.

(21) Appl. No.: 17/469,963

(22) Filed: Sep. 9, 2021

(65) Prior Publication Data

US 2023/0100705 A1 Mar. 30, 2023

Related U.S. Application Data

(60) Provisional application No. 63/189,066, filed on May 15, 2021.

(51) Int. Cl.
*B25B 23/16* (2006.01)
*B25B 23/00* (2006.01)
*B25G 1/04* (2006.01)

(52) U.S. Cl.
CPC .......... *B25B 23/16* (2013.01); *B25B 23/0007* (2013.01); *B25G 1/043* (2013.01)

(58) Field of Classification Search
CPC . B25B 23/16; B25B 23/0007; B25B 23/0021; B25B 23/0035; B25B 13/06; B25B 13/0812; B25B 13/14; B25B 13/16; B25B 13/46; B25B 13/48; B25B 13/481; B25G 1/043; B25G 1/10; B25G 1/005; B25G 1/025; B25G 1/063
See application file for complete search history.

(56) References Cited

U.S. PATENT DOCUMENTS 132,058 A * 10/1872 Cumming, Jr. .......... B25B 23/00 81/180.1
174,634 A * 3/1876 Merrill .................... B25B 13/48 7/165
253,753 A * 2/1882 Ohl ........................ B25B 13/463 81/177.1
391,211 A * 10/1888 Torkelson ............... B25B 13/48 81/118
595,737 A * 12/1897 Schlangen ........... B65D 39/088 217/109
603,838 A * 5/1898 Granville et al. ...... B25B 13/48 81/74
825,401 A * 7/1906 Merkens ................. B25B 13/48 81/177.1
912,338 A * 2/1909 Walden ................... B25B 13/48 7/138
914,199 A * 3/1909 Stiren ..................... B25B 13/08 7/138

(Continued)

*Primary Examiner* — David B. Thomas
(74) *Attorney, Agent, or Firm* — Troutman Pepper Hamilton Sanders LLP

(57) ABSTRACT

The present disclosure provides a tool comprising a centrally placed tool head disposed between first and second handle portions which a user may grip with either hand in order to comfortable apply torque about the central toolhead from either side in a safe manner. The ability to effectively utilize force from both arms without losing balance facilitates a greater application of torque. The tool may be a wrench of any type utilizing a central wrench head of any type, but may also be another type of leverage-based tool such as a screwdriver or hammered tool.

15 Claims, 19 Drawing Sheets

(56) References Cited

U.S. PATENT DOCUMENTS 1,017,550 A * 2/1912 Johnson .................. B25B 13/16 81/169
1,049,349 A * 1/1913 Fagerstrom ............... B25F 1/00 81/170
1,431,805 A * 10/1922 Hrenczuk ................. B25F 1/00 81/177.1
1,442,184 A * 1/1923 Smith .................... B25G 1/007 81/437
1,838,278 A * 12/1931 Montagnon ......... B25B 13/5016 81/176.1
2,284,871 A * 6/1942 Huss ..................... B25B 13/481 81/177.2
2,386,254 A * 10/1945 Meyer ..................... B25B 13/10 81/176.15
2,394,808 A * 2/1946 Rohr ....................... B25B 13/48 81/176.1
2,465,152 A * 3/1949 Ellison ................... B25G 1/005 81/177.5
2,520,652 A * 8/1950 Pfauser .................. B25G 1/005 74/544
2,705,433 A * 4/1955 Goldman ................ B25B 13/56 81/177.1
3,121,356 A * 2/1964 Davis ...................... B25B 13/08 81/125.1
3,715,937 A * 2/1973 Cade ..................... B25B 13/481 81/177.8
D274,404 S * 6/1984 Adler ............................... D8/28
4,825,733 A * 5/1989 Chinchar ............... B25G 1/005 81/177.1
5,001,947 A * 3/1991 Andersen-Vie ........ B25G 1/005 81/177.2
5,797,300 A * 8/1998 Fairbanks ............... B25B 23/16 81/177.8
5,894,767 A * 4/1999 Wridt .................. B25B 27/0071 81/DIG. 7
5,921,157 A * 7/1999 Smith ................... B25B 13/461 81/177.5
6,662,688 B1 * 12/2003 Avery ................... B25B 13/005 81/177.85
6,938,521 B1 * 9/2005 Skeens .................. B25B 13/461 81/177.5
7,228,766 B1 * 6/2007 Shyu ...................... B25G 1/005 81/177.85
7,244,882 B1 * 7/2007 Colwell ................. G10D 13/02 84/411 R
7,351,900 B2 * 4/2008 May ....................... G10D 13/02 84/413
8,485,074 B2 * 7/2013 Farrell ................... A62C 99/00 7/138
8,539,864 B1 * 9/2013 Kennedy ................ B25G 1/005 81/177.8
8,813,612 B2 * 8/2014 Steinweg ................ F16D 1/108 81/177.85
8,935,972 B2 * 1/2015 Farrell ...................... B25B 7/22 7/138
9,278,445 B2 * 3/2016 Li .......................... B25G 1/005
9,498,870 B2 * 11/2016 Davis ........................ B25F 1/02
9,566,693 B2 * 2/2017 Atkinson .............. B25B 13/481
9,934,764 B2 * 4/2018 Jones ..................... G10D 13/16
10,343,273 B2 * 7/2019 Johnson .................. B25B 23/16
10,456,900 B2 * 10/2019 Liou ....................... B25B 23/16
10,737,369 B2 * 8/2020 Steinhauser ............ B25B 13/06
10,933,515 B2 * 3/2021 Gunther ................. B25G 1/005
11,130,213 B1 * 9/2021 Ashenbrenner ..... B25B 23/0007
11,358,270 B2 * 6/2022 Fuller ..................... B25B 13/06
11,383,372 B2 * 7/2022 Avalos ................ B25B 23/0021
11,478,906 B2 * 10/2022 Sheehan ................. B25B 13/48
11,607,797 B2 * 3/2023 Barongan .............. B25G 1/005
2004/0040421 A1 * 3/2004 Prax ........................ B25B 13/08 81/121.1
2008/0083305 A1 * 4/2008 Miley ..................... B25B 13/02 81/437
2008/0223179 A1 * 9/2008 Nash ..................... B25B 13/461 81/58
2009/0107303 A1 * 4/2009 Steinweg ................. B25G 3/28 81/177.85
2009/0126540 A1 * 5/2009 Kammermeier .......... B25B 7/00 81/427.5
2009/0308209 A1 * 12/2009 Cross .................... B25B 13/461 81/109
2010/0013171 A1 * 1/2010 Haimer ............... B25B 23/1427 279/147
2010/0282029 A1 * 11/2010 Hsieh ...................... B25B 13/06 81/121.1
2011/0271802 A1 * 11/2011 Honig ....................... B25B 7/00 81/489
2013/0213191 A1 * 8/2013 Harvey ................... B25B 13/08 81/125
2014/0186131 A1 * 7/2014 Niu ........................ B23G 1/261 408/123
2014/0360321 A1 * 12/2014 Steinweg ............ B25B 23/0035 81/177.85
2017/0021477 A1 * 1/2017 Kim ........................ B25B 13/16
2017/0136615 A1 * 5/2017 Storey ...................... B25B 13/06
2017/0291287 A1 * 10/2017 Bendix ................. B25B 13/462
2018/0126518 A1 * 5/2018 Chan ..................... B25B 13/005
2018/0318986 A1 * 11/2018 Weng .................... B25B 13/463
2019/0126450 A1 * 5/2019 Gauthier ............. B25B 23/1427
2020/0061779 A1 * 2/2020 Gunther .............. B25B 23/0035
2020/0238499 A1 * 7/2020 Fuller ................. B25B 23/0021
2020/0282544 A1 * 9/2020 Barongan .............. B25G 1/102
2021/0078142 A1 * 3/2021 Chang .................... B25G 1/005

* cited by examiner

CENTER DRIVE WRENCH

This application claims priority to U.S. Provisional Application No. 63/189,066, filed May 15, 2021, the content of which is hereby incorporated by reference in its entirety.

FIELD

This technology relates generally to the technical field of hardware tools, and more specifically to a tool having a central toolhead or wrench head disposed between first and second handle portions.

BACKGROUND

The wrench is a commonly used installation and removal tool. It is a hand tool that uses the principle of leverage to turn bolts, screws, nuts, and other threads to hold the openings or sleeves of bolts or nuts using various types of wrench heads for connecting with those elements.

Traditionally, wrenches have been provided with a wrench head for securing to a bolt or nut element at either one or both ends of a straight handle portion. A user applies force at a distal end of the wrench to the wrench head connected to the nut or bolt element to rotate the bolt or nut in the direction of thread rotation.

A problem with this construction is that it often forces the user to position their body in such a way that only allows them to use one hand to effectively apply leveraged force to the nut or bolt element, limiting the amount of power applied. For bolts and nuts that are particularly difficult to turn due to rust, metal warping, and other issues, this can prevent users from using the full amount of strength required to turn and remove the element. Using both hands to apply force from an unstable position will cause the body to lose balance when exerting force, which can be a safety risk.

Similar problems exist with tools other than wrenches where leveraged force is applied across a handle portion. It is within this context that the present invention is provided.

SUMMARY

The present disclosure provides a tool comprising a centrally placed tool head disposed between first and second handle portions which a user may grip with either hand in order to comfortable apply torque about the central toolhead from either side in a safe manner. The ability to effectively utilize force from both arms without losing balance facilitates a greater application of torque. The tool may be a wrench utilizing a central wrench head of any type, but may also be another type of leverage-based tool such as a screwdriver or hammered tool.

Thus, according to one aspect of the present disclosure there is provided a tool having improved leverage properties, the tool comprising a first handle portion, a central tool head connected to the first handle portion, and a second handle portion connected to the central tool head, the first and second handle portions extending from the central tool head along a shared plane and at an angle of up to 180 degrees with respect to one another.

In some embodiments, the tool is a wrench, and the central toolhead is a wrench head.

The central toolhead may be slidably adjustable with respect to the first handle portion and/or the second handle portion.

The central toolhead may be rotationally adjustable with respect to the first handle portion and/or the second handle portion about an axis centered on the center toolhead and perpendicular to the shared plane of the handle portions such that the angle between the first handle portion and second handle portion can be changed.

The first handle portion and/or the second handle portion may be detachably connected to the central toolhead by an interchangeable connection.

The first handle portion may further comprise a second toolhead attached to the handle portion at the end distal from the connection to the central toolhead.

The second handle portion may further comprise a third toolhead attached to the handle portion at the end distal from the connection to the central toolhead.

The central toolhead may protrude outwardly from a central base portion.

The wrench head may be one of the following types: a Pipe Wrench head, Chain Wrench head, Socket Wrench head, Torque Wrench head, Ratcheting Wrench head, Oil Filter Wrench head, Combination wrench head, Open-Ended Wrench head, Closed-Ended Wrench head, Crowfoot Wrench head, Pedal Wrench head, Monkey Wrench head, Pliers Wrench head, Strap Wrench head, Plumber's Wrench head, Tap Wrench head, Spud Wrench head, Alligator Wrench head, Basin Wrench head, Armorer's Wrench head, Dog Bone Wrench head, Drum Key Wrench head, Bung Wrench head, Fan Clutch Wrench head, Hammer Wrench head, Torx Key Wrench head, Conc Wrench head, Garbage Disposal Wrench head, Tension Wrench head, Spoke Wrench head, Spanner Wrench head, Nut Driver Wrench head, Box End Wrench head, Flare Nut Wrench head, Allen Wrench head, Bristol Wrench head, Ratcheting Box Wrench head, Flex wrench head, Socket Ratchet Wrench head, Lug Wrench head, and Spark Plug Wrench head.

Furthermore, the first handle portion may further comprise a second wrench head attached to the handle portion at the end distal from the connection to the central toolhead, the second wrench head also being selected from the listed types.

Additionally or alternatively, the second handle portion may further comprise a third wrench head attached to the handle portion at the end distal from the connection to the central toolhead, the second wrench head also being selected from the listed types.

The wrench head may have one of the following drive geometry types: flank drive, spline drive, 10-pointed drive, 12-pointed drive.

The wrench as a whole may be one of the following types: Pipe Wrench, Chain Wrench, Socket Wrench, Torque Wrench, Ratcheting Wrench, Oil Filter Wrench, Combination Wrench, Adjustable Wrench, Impact Wrench, Crowfoot Wrench, Pedal Wrench, Monkey wrench, Pliers Wrench, Strap wrench, Plumber's Wrench, Tap Wrench, Spud Wrench, Alligator Wrench, Basin Wrench, Armorer's Wrench, Dog Bone Wrench, Drum Key, Bung Wrench, Fan Clutch Wrench, Hammer Wrench, Torx Key, Cone Wrench, Garbage Disposal Wrench, Tension Wrench, Spoke Wrench, Spanner Wrench, Nut Driver Wrench, Box End Wrench, Flare Nut Wrench, Allen Wrench, Bristol Wrench, Ratcheting Box Wrench, Flex wrench, Socket Ratchet Wrench, Lug Wrench, and Spark Plug Wrench.

BRIEF DESCRIPTION OF THE DRAWINGS

Various embodiments of the invention are disclosed in the following detailed description and accompanying drawings.

Figure 1:
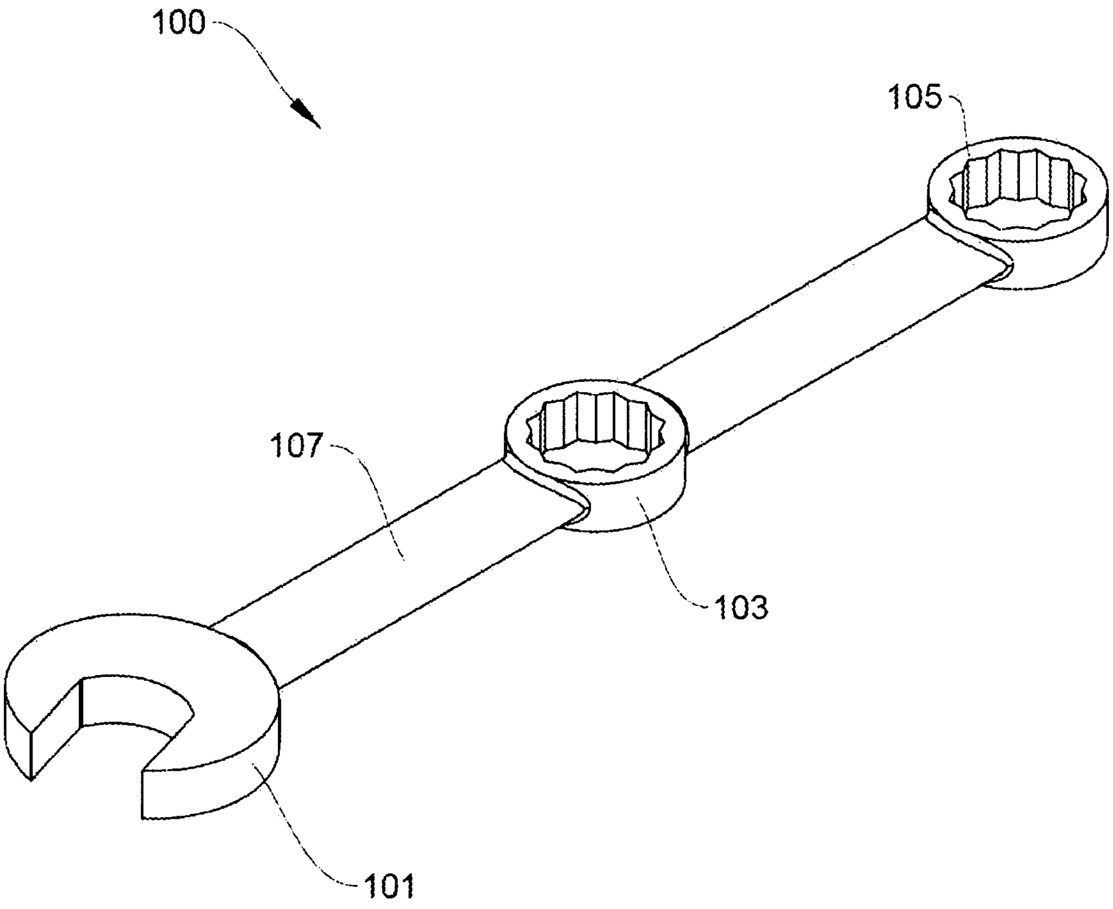
FIG. 1 illustrates an isometric view of an example configuration of a tool according to the present disclosure in the form of a wrench having a closed-ended wrench head disposed between an open-ended wrench head and a second closed-ended wrench head.

Common reference numerals are used throughout the figures and the detailed description to indicate like elements. One skilled in the art will readily recognize that the above figures are examples and that other architectures, modes of operation, orders of operation, and elements/functions can be provided and implemented without departing from the characteristics and features of the invention, as set forth in the claims.

DETAILED DESCRIPTION

The following is a detailed description of exemplary embodiments to illustrate the principles of the invention. The embodiments are provided to illustrate aspects of the invention, but the invention is not limited to any embodiment. The scope of the invention encompasses numerous alternatives, modifications and equivalent; it is limited only by the claims.

Numerous specific details are set forth in the following description in order to provide a thorough understanding of the invention. However, the invention may be practiced according to the claims without some or all of these specific details. For the purpose of clarity, technical material that is known in the technical fields related to the invention has not been described in detail so that the invention is not unnecessarily obscured.

The terminology used herein is for the purpose of describing particular embodiments only and is not intended to be limiting of the invention. As used herein, the term "and/or" includes any combinations of one or more of the associated listed items. As used herein, the singular forms "a," "an," and "the" are intended to include the plural forms as well as the singular forms, unless the context clearly indicates otherwise. It will be further understood that the terms "comprises" and/or "comprising," when used in this specification, specify the presence of stated features, steps, operations, elements, and/or components, but do not preclude the presence or addition of one or more other features, steps, operations, elements, components, and/or groups thereof.

The present disclosure provides a tool which enables the user to tighten and loosen a fastener, nut or bolt from a central point where a toolhead rests between two handle portions, for example the center of the wrench shaft, while holding the ends of the handle portions with both hands for more power and leverage during turning, similarly to the likes of a T-bar wrench.

The tool does not necessarily have to be a wrench, and could also be implemented as a screwdriver or hammered tool. If the product is a wrench, any combination of different wrench heads may be used between the central toolhead and toolheads on the opposing ends of the handle portions, including having no toolhead son the ends of the handle portions.

Various example configurations are illustrated and described. These are meant solely as illustrative examples, and not limiting. Other configurations and modifications not explicitly described here could also be included in conjunction with the tool of the present disclosure as claimed.

Figure 2:
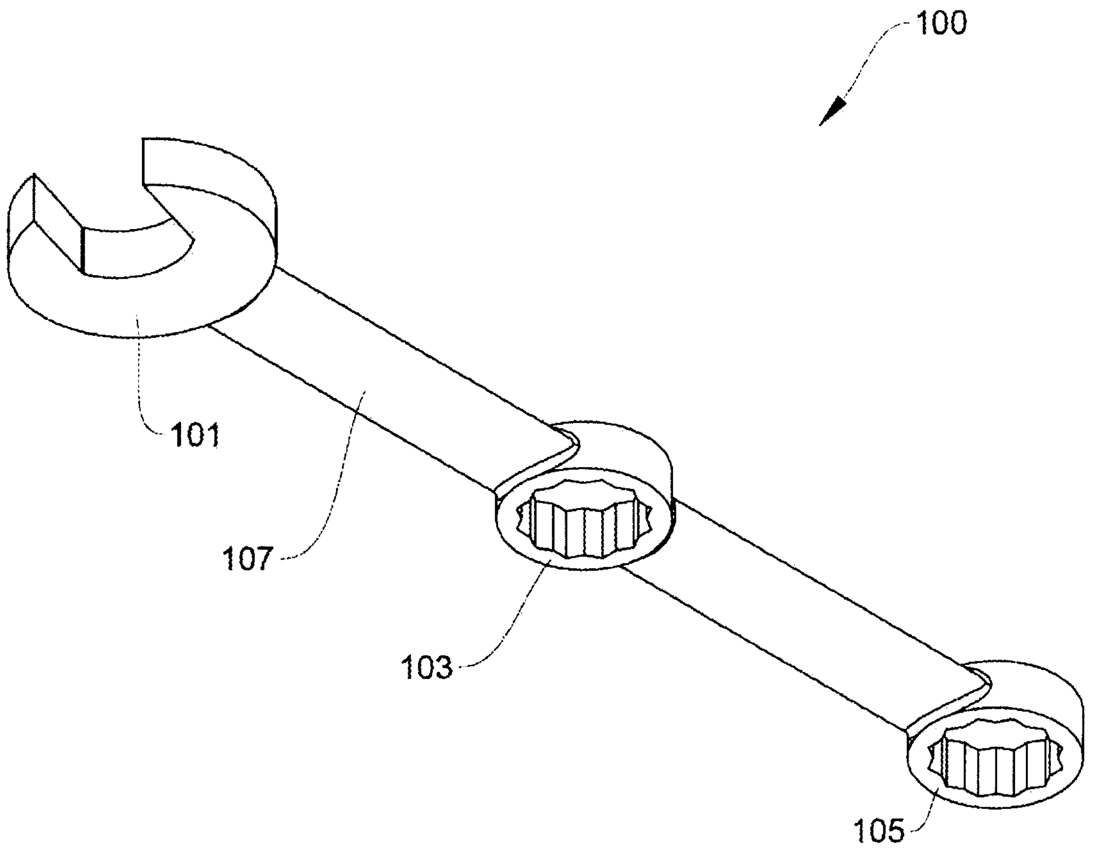
FIG. 2 illustrates a second isometric view of the example configuration of the tool of FIG. 1.
Figure 3:
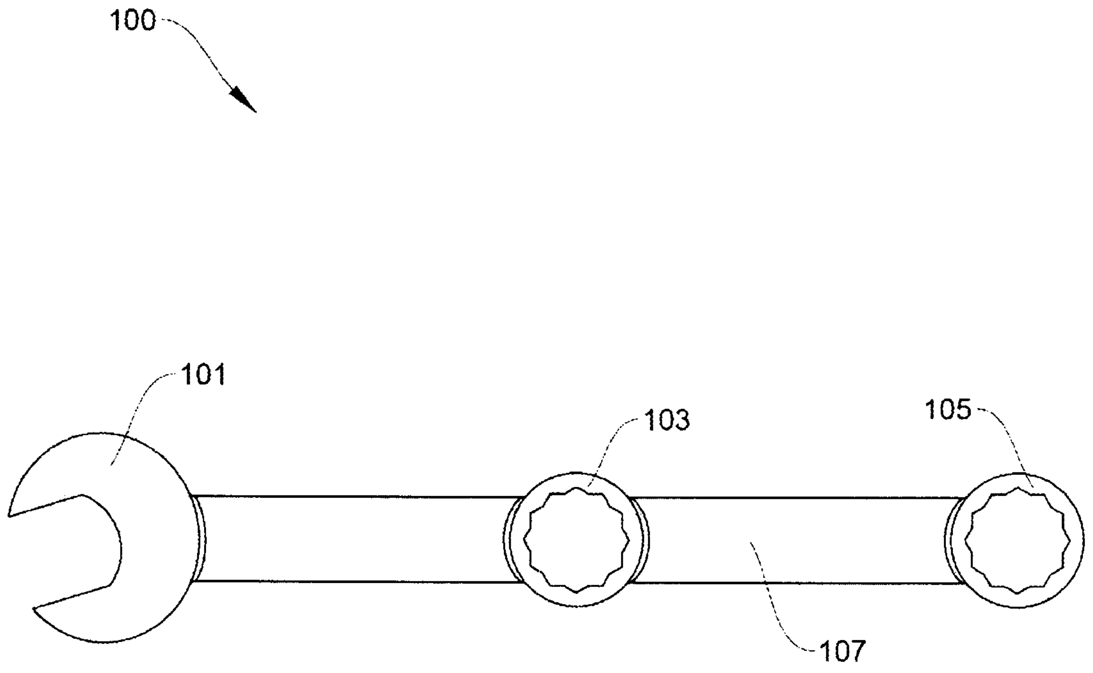
FIG. 3 illustrates an isometric top-down view of the example configuration of the tool of FIG. 1.

Referring to FIGS. 1-3, various views of an example configuration of a wrench 100 according to the present disclosure are shown.

In the illustrated configuration, the wrench has a closed-ended wrench head 103 disposed at the center between two handle portions 107, and with an open-ended wrench head 101 and a second closed-ended wrench head 105 at the opposing distal ends of the wrench.

Figure 4A:
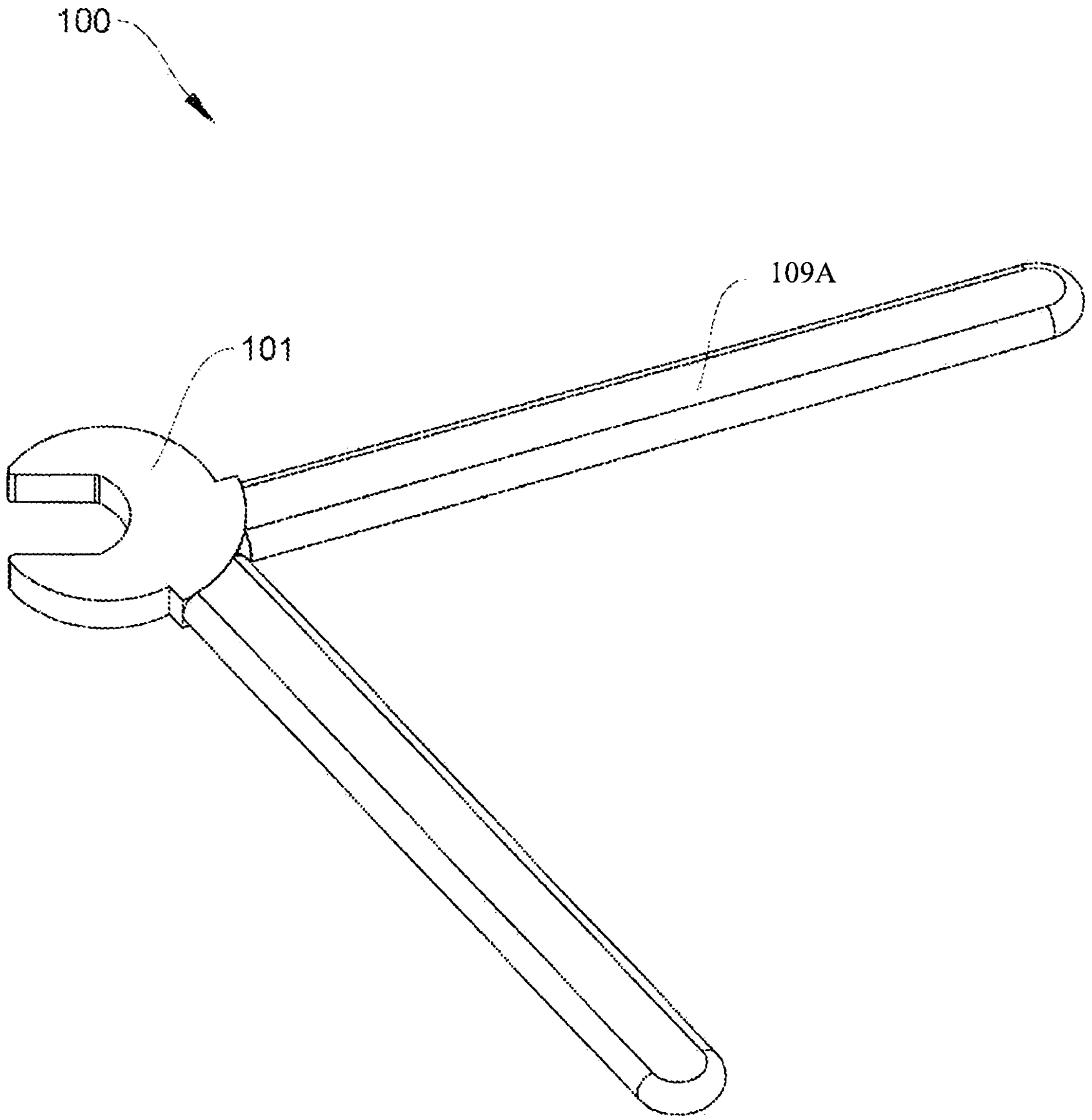
FIGS. 4A-C illustrate isometrics view of other example configurations of a tool according to the present disclosure in the form of a wrench having an open-ended wrench head disposed between first and second handle portions at a 45 degree angle to one another, a wrench with a central open-ended wrench head disposed between first and second handle portions, and a wrench with central, open-ended, detachable, and interchangeable wrench heads disposed between first and second handle portions, respectively.
Figure 4B:
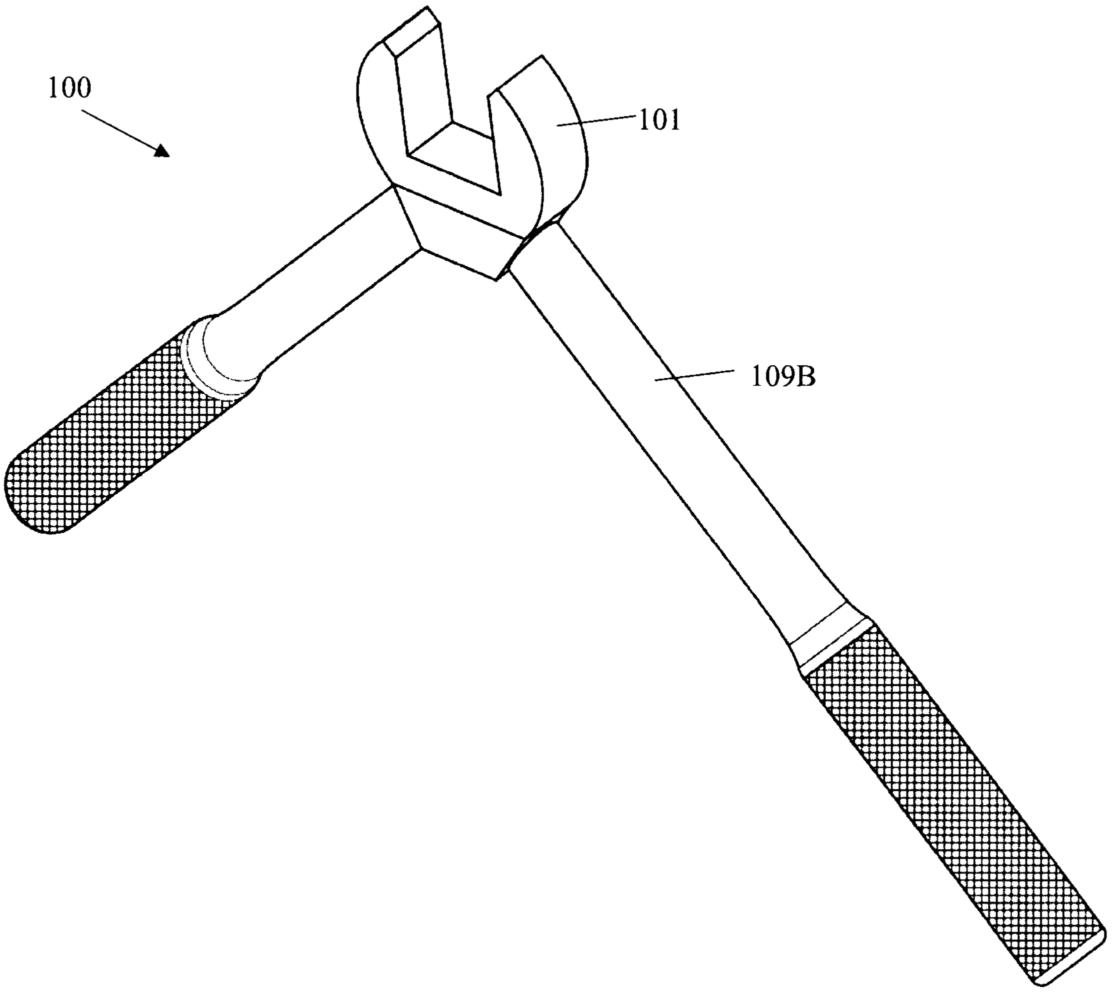
Figure 4C:
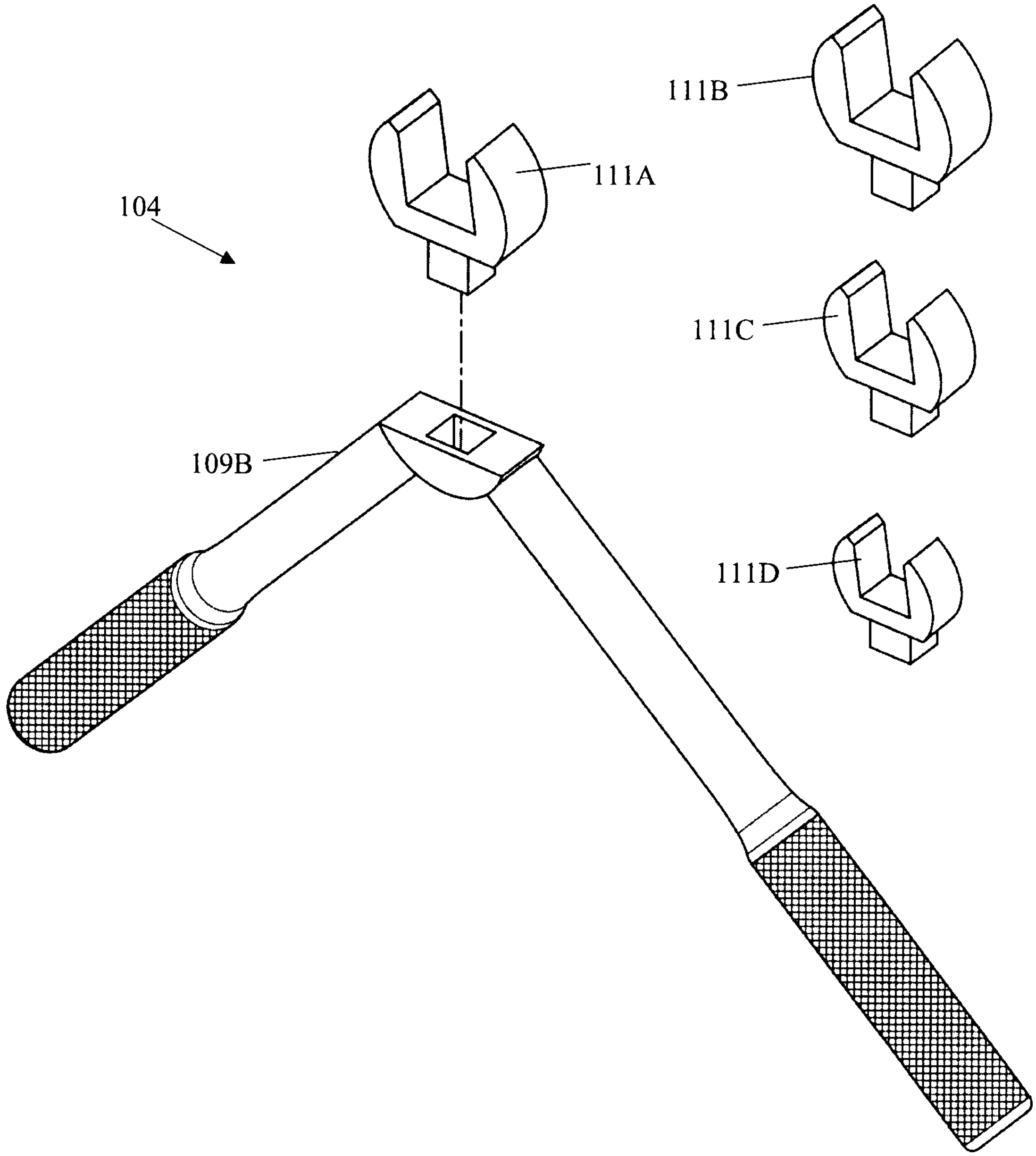

An alternative configuration of the disclosed wrench 100 is shown in FIGS. 4A-C. Referring more specifically to FIG. 4A, the wrench 100 has an open-ended wrench head 101 disposed between first and second handle portions 109A, which are at a 60 degree angle to one another. The first and second handle portions 109A are generally formed of one piece of material. In FIG. 4B, the wrench 100 is illustrated with the open-ended wrench head 101 positioned on top of V-shaped first and second handle portions 109B. In FIG. 4C, another wrench 104 is illustrated with central, open-ended, detachable, and interchangeable wrench heads 111A-D configured to be positioned on top of the V-shaped first and second handle portions 109B and having variant sizes.

Figure 5A:
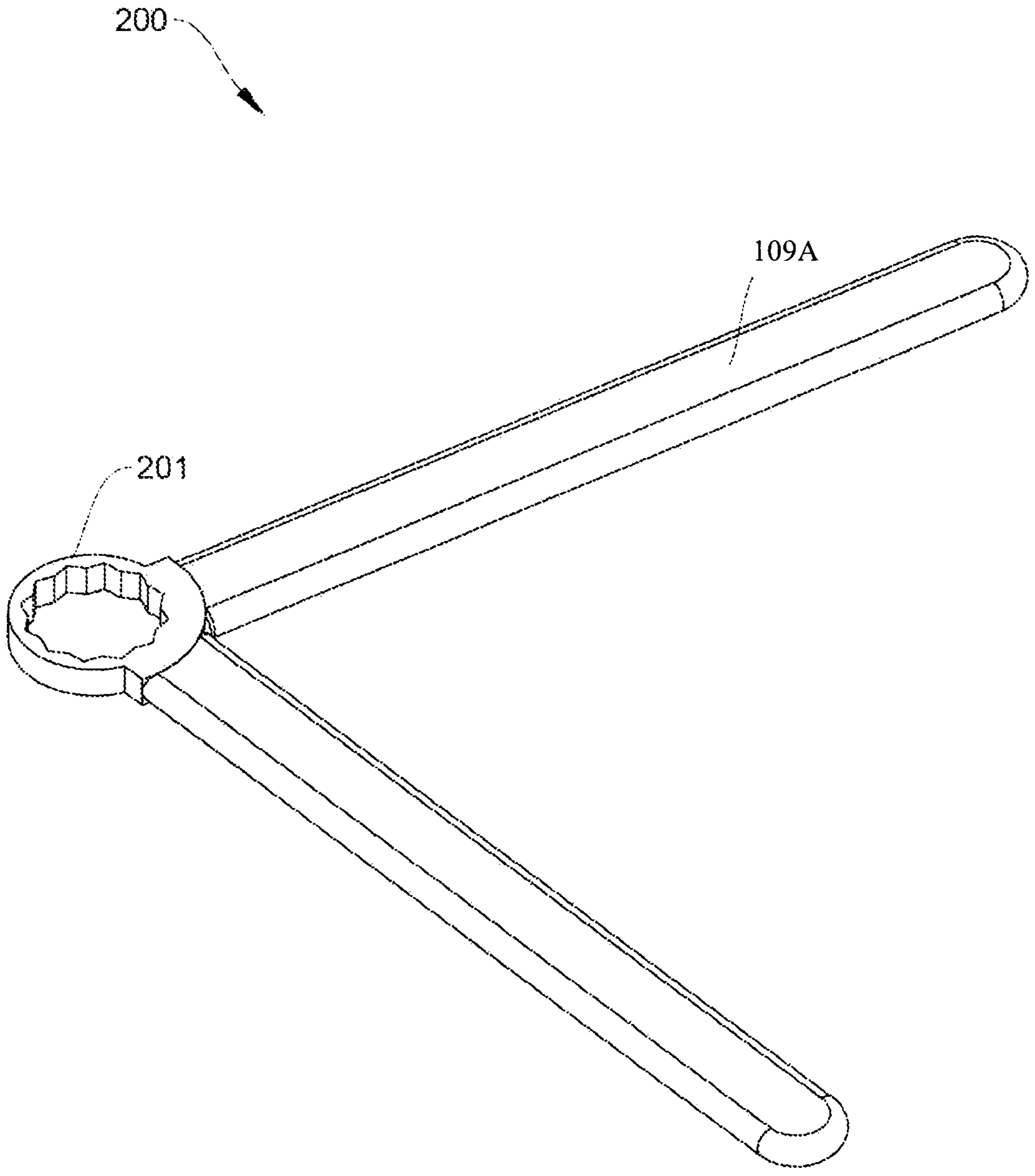
FIGS. 5A-C illustrate isometric views of other example configurations of a tool according to the present disclosure in the form of a wrench having a closed-ended wrench head disposed between first and second handle portions at a 45 degree angle to one another, a wrench with a central closed wrench head disposed between first and second handle portions, and a wrench with central, closed, detachable, and interchangeable wrench heads disposed between first and second handle portions, respectively.
Figure 5B:
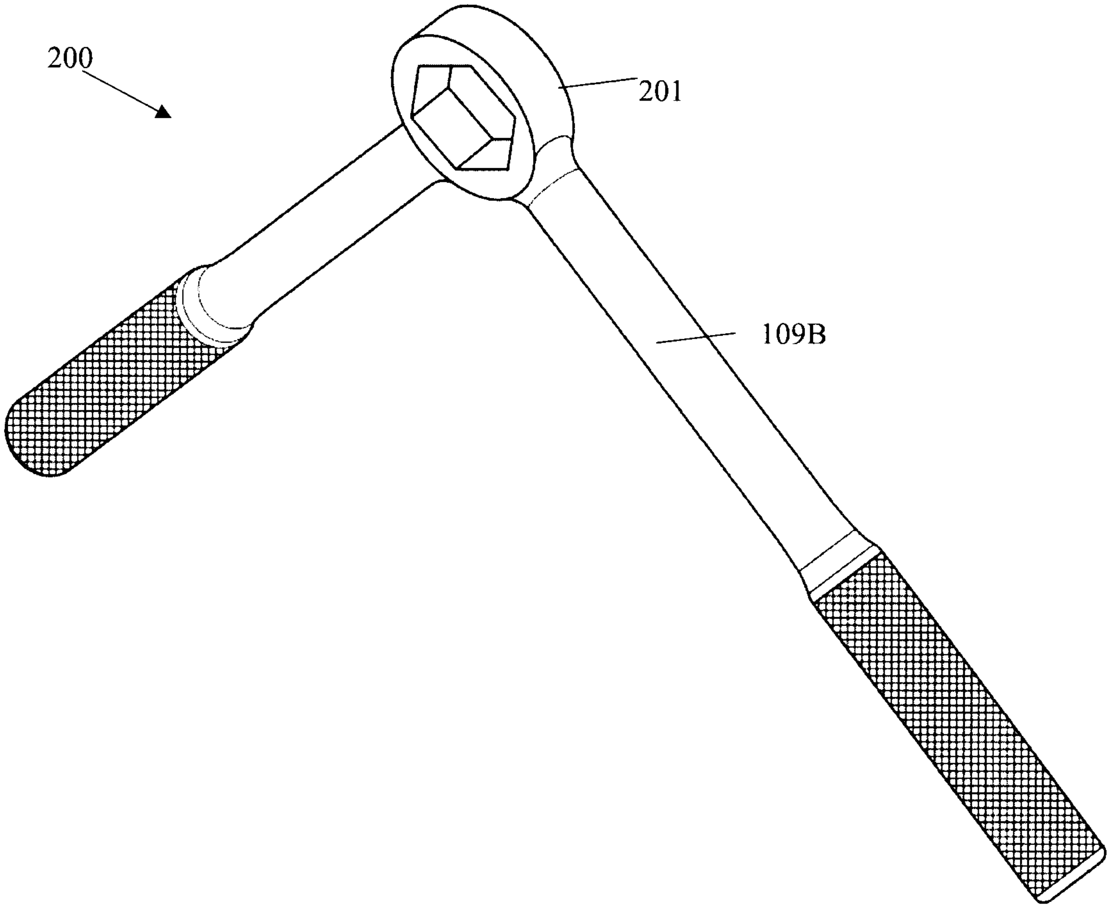
Figure 5C:
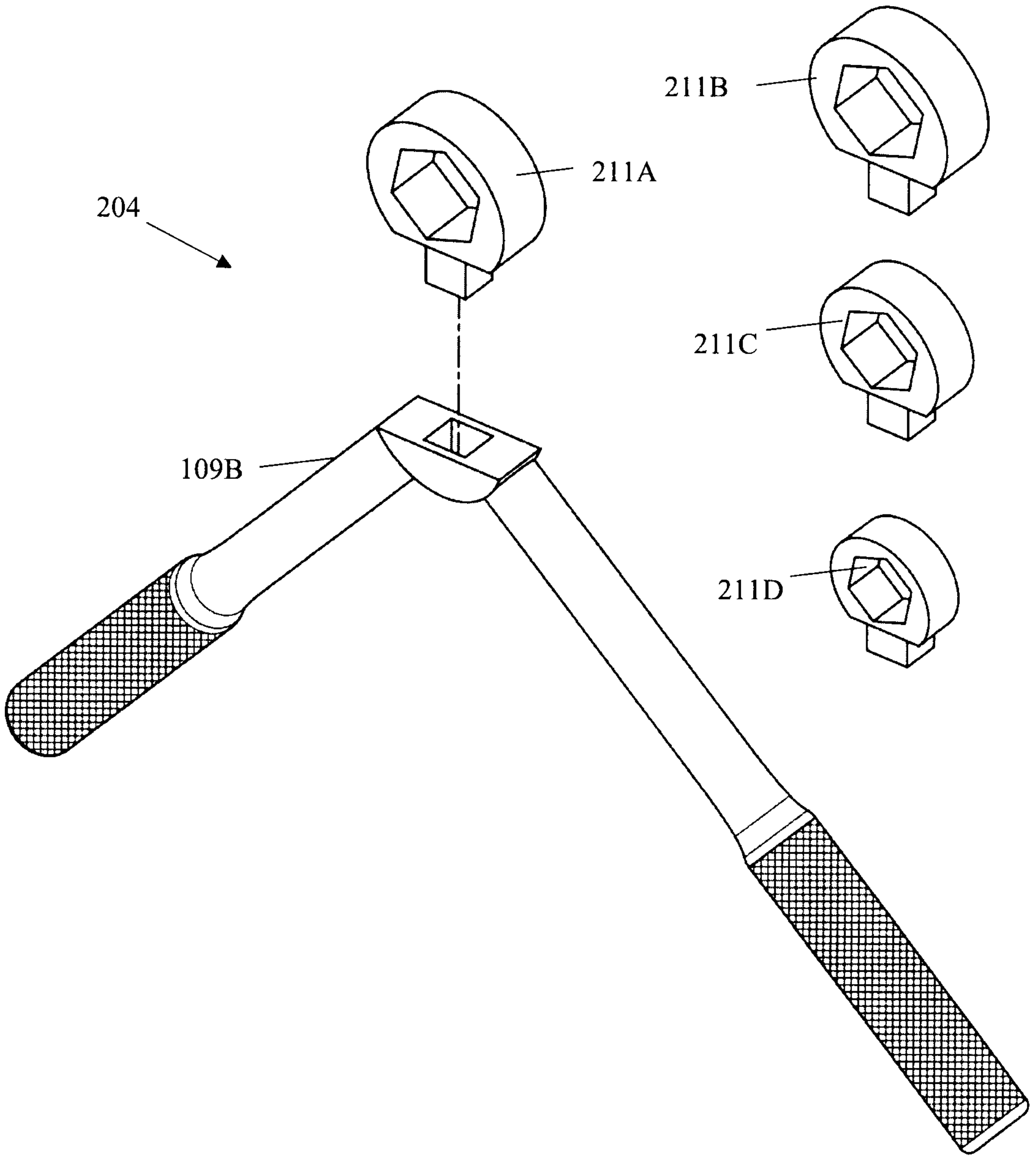

FIGS. 5A-C show similar configurations to FIGS. 4A-C, respectively, but the wrench 200 comprises a closed-ended wrench head 201 as the central toolhead disposed between the two handle portions 109A. In FIG. 5B, the wrench 200 is illustrated with the closed wrench head 201 positioned on top of V-shaped first and second handle portions 109B. In FIG. 5C, another wrench 204 is illustrated with central, closed, detachable, and interchangeable wrench heads 211A-D configured to be positioned on top of the V-shaped first and second handle portions 109B and having variant sizes.

Figure 6:
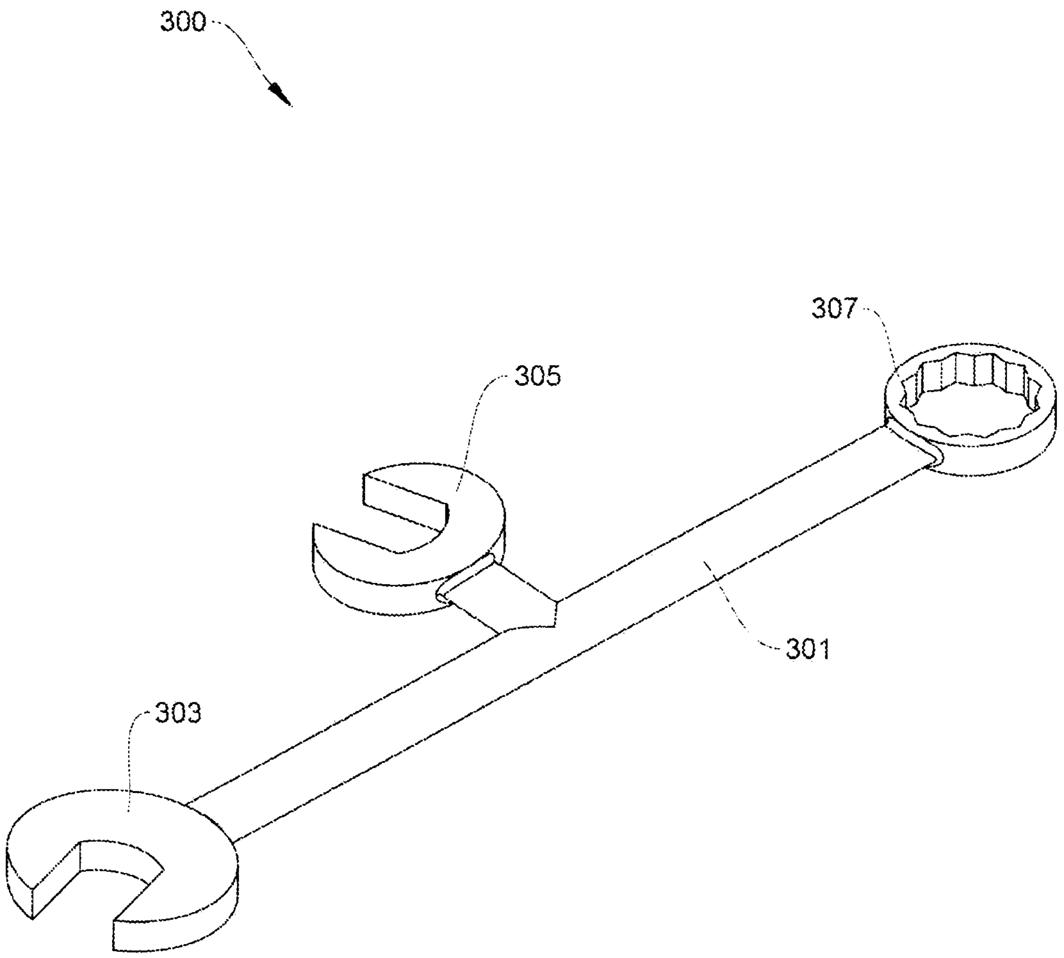
FIG. 6 illustrates an isometric view of another example configuration of a tool according to the present disclosure in the form of a wrench having a central open-ended wrench head extending from the joint of the two handle portions.

Referring to FIG. 6 another alternative example configuration is shown with a wrench 300 having a central open-ended wrench head 305 extending from the joint of the two handle portions 301.

An open-ended wrench head 303 and a closed-ended wrench head 307 are disposed at either end of the straight handle portions 301.

Figure 7:
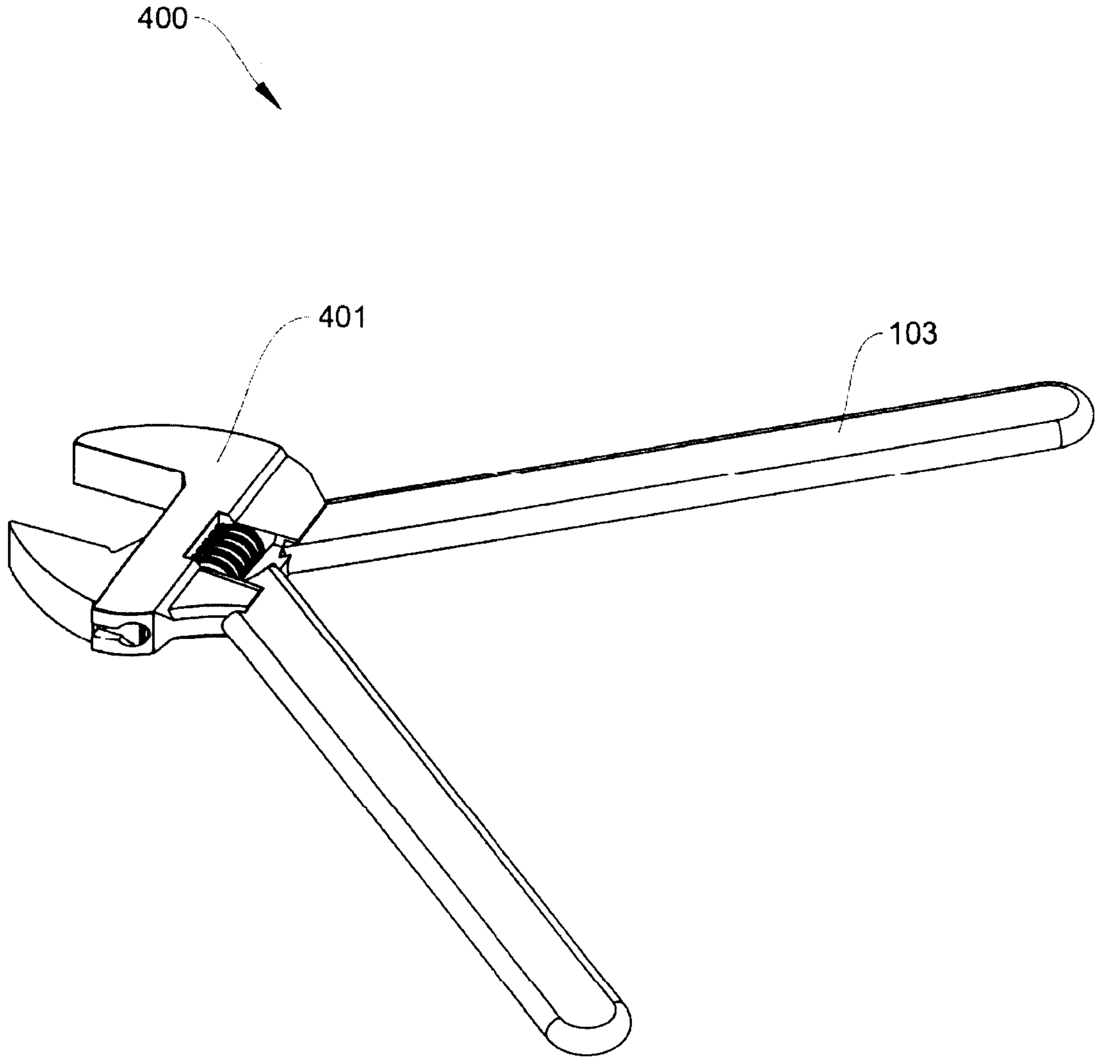
FIG. 7 illustrates an isometric view of another example configuration of a tool according to the present disclosure in the form of a wrench having an adjustable open-ended wrench head disposed between first and second handle portions at a 45 degree angle to one another.

As shown in FIG. 7, the tool can also comprise a wrench 400 with an adjustable open-ended central wrench head 401 disposed between the two handle 103.

Figure 8:
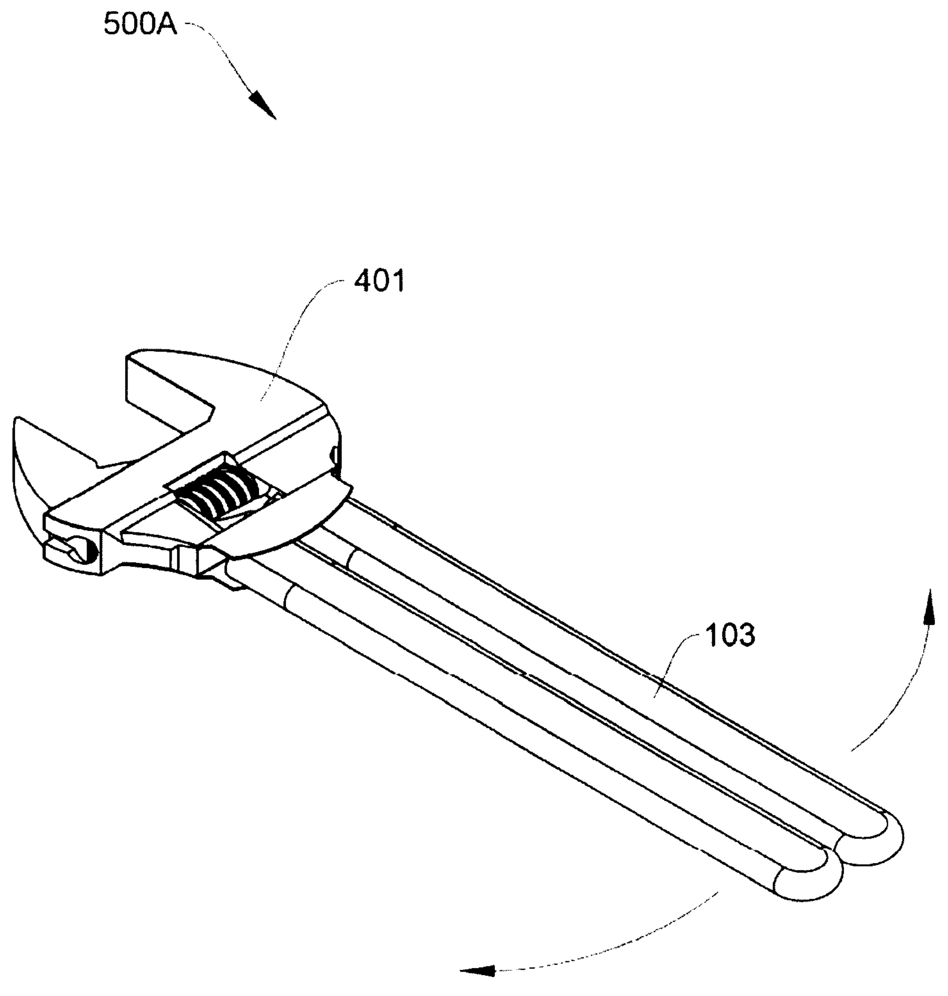
FIG. 8 illustrates an isometric view of another example configuration of a tool according to the present disclosure in the form of a wrench having an adjustable open-ended wrench head disposed between first and second handle portions which are adjustable connected so as to be able to change the angle between them, shown in a closed position.
Figure 9:
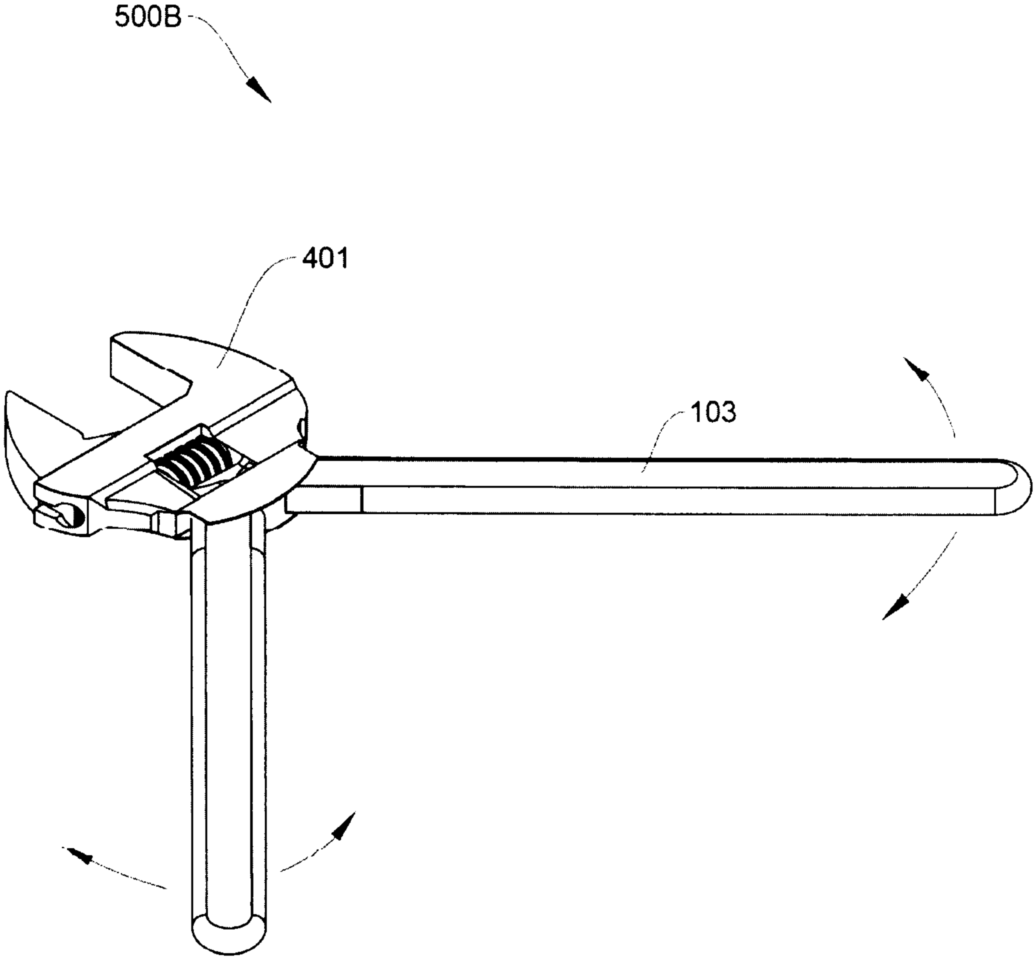
FIG. 9 illustrates an isometric view of another example configuration of a tool according to the present disclosure in the form of a wrench having an adjustable open-ended wrench head disposed between first and second handle portions which are adjustable connected so as to be able to change the angle between them, shown in a partially open position.
Figure 10:
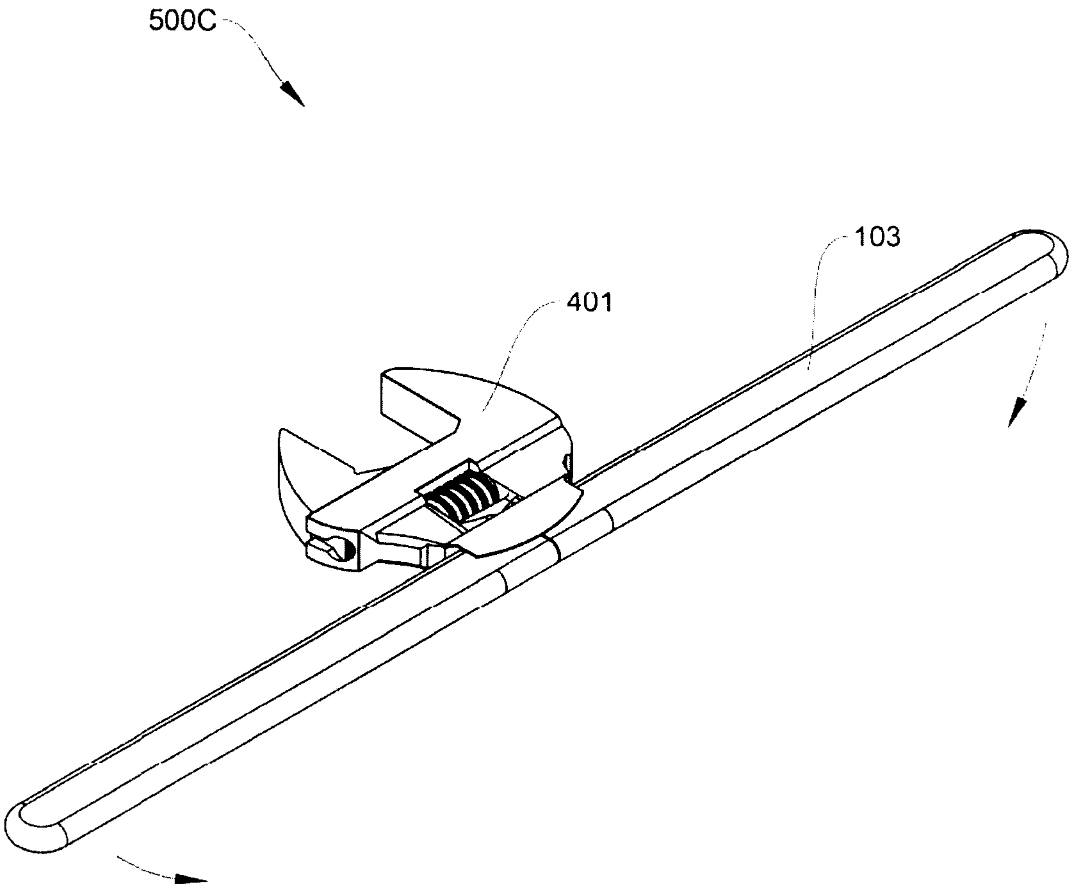
FIG. 10 illustrates an isometric view of another example configuration of a tool according to the present disclosure in the form of a wrench having an adjustable open-ended wrench head disposed between first and second handle portions which are adjustable connected so as to be able to change the angle between them, shown in a closed position.

Furthermore, in some configurations, the handle portions 103 themselves may be adjustable as shown in FIGS. 8-10 where another example configuration is shown in the form of a wrench 500 having an adjustable open-ended wrench head 401 disposed between first and second handle portions 103, but with the handle portions 103 being rotatably adjustable so as to be able to change the angle between them like a pair of scissors.

In this configuration, the first and second handle portions are joined together by a flexible joint.

Referring to FIG. 8, the configuration of FIGS. 8-10 may have the handle portions completely together in position 500A. The handle portions then effectively act as a single wider handle.

Referring to FIG. 9, the configuration of FIGS. 8-10 may have the handle portions partially open in position 500B or any angle between 0 and 180 degrees. This flexibility can be very useful when working in tight spaces.

Referring to FIG. 10, the configuration of FIGS. 8-10 may have the handle portions completely apart as in position 500C to form a long handle shaft with the wrench head 401 at the center. This allows for maximum torque to be applied.

Although not illustrated, the central toolhead may also be slidable along the handle portions to bias it away from the center of the wrench shaft, the handle portions may be detachable from the central toolhead so that different handle portions appropriate for the job at hand can be interchangeably affixed to the tool, and the handle portions may even be retractable to provide increased versatility.

Figure 11:
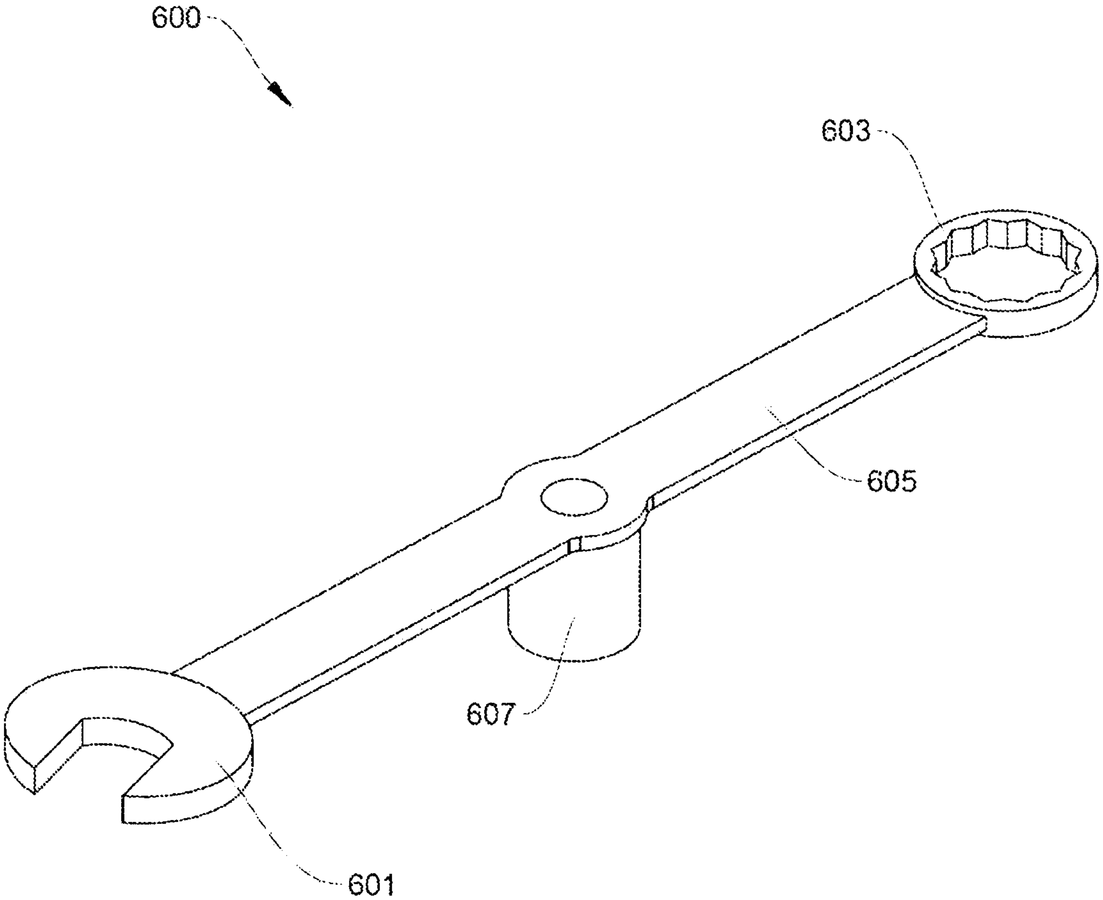
FIG. 11 illustrates an isometric view of another example configuration of a tool according to the present disclosure having a similar configuration to that of FIGS. 1-3, but with the central wrench head protruding perpendicularly to the plan of the handle portions so as to provide space for a user's fingers.

Referring to FIG. 11, another example configuration of a wrench 600 having a similar configuration to that of FIGS. 1-3 is shown, with an open ended wrench head 601 and a closed ended wrench head 603 disposed at either end of the handle portions which from a straight shaft, but also with the central wrench head 607 protruding perpendicularly to the plane of the handle portions similarly to a nut driver wrench head so that when the central wrench head is placed on a nut, the wrench will be raised or elevated so the user will have room to fit his fingers underneath the wrench when he holds it with both hands. Otherwise, the wrench might lay flush on a base surface that the fastener is located on, preventing a user from properly gripping the handle portions.

The wrench head, both the central head and the head at either end of the handle portions, can be any one of the following non-exhaustive list: a Pipe Wrench head, Chain Wrench head, Socket Wrench head, Torque Wrench head, Ratcheting Wrench head, Oil Filter Wrench head, Combination wrench head, Open-Ended Wrench head, Closed-Ended Wrench head, Crowfoot Wrench head, Pedal Wrench head, Monkey Wrench head, Pliers Wrench head, Strap Wrench head, Plumber's Wrench head, Tap Wrench head, Spud Wrench head, Alligator Wrench head, Basin Wrench head, Armorer's Wrench head, Dog Bone Wrench head, Drum Key Wrench head, Bung Wrench head, Fan Clutch Wrench head, Hammer Wrench head, Torx Key Wrench head, Cone Wrench head, Garbage Disposal Wrench head, Tension Wrench head, Spoke Wrench head, Spanner Wrench head, Nut Driver Wrench head, Box End Wrench head, Flare Nut Wrench head, Allen Wrench head, Bristol Wrench head, Ratcheting Box Wrench head, Flex wrench head, Socket Ratchet Wrench head, Lug Wrench head, and Spark Plug Wrench head.

If the wrench head is a socket head type, it can have 12 any socket geometry, including but not limited to: flank drive, spline drive, 10-pointed drive, 12-pointed drive.

Figure 12A:
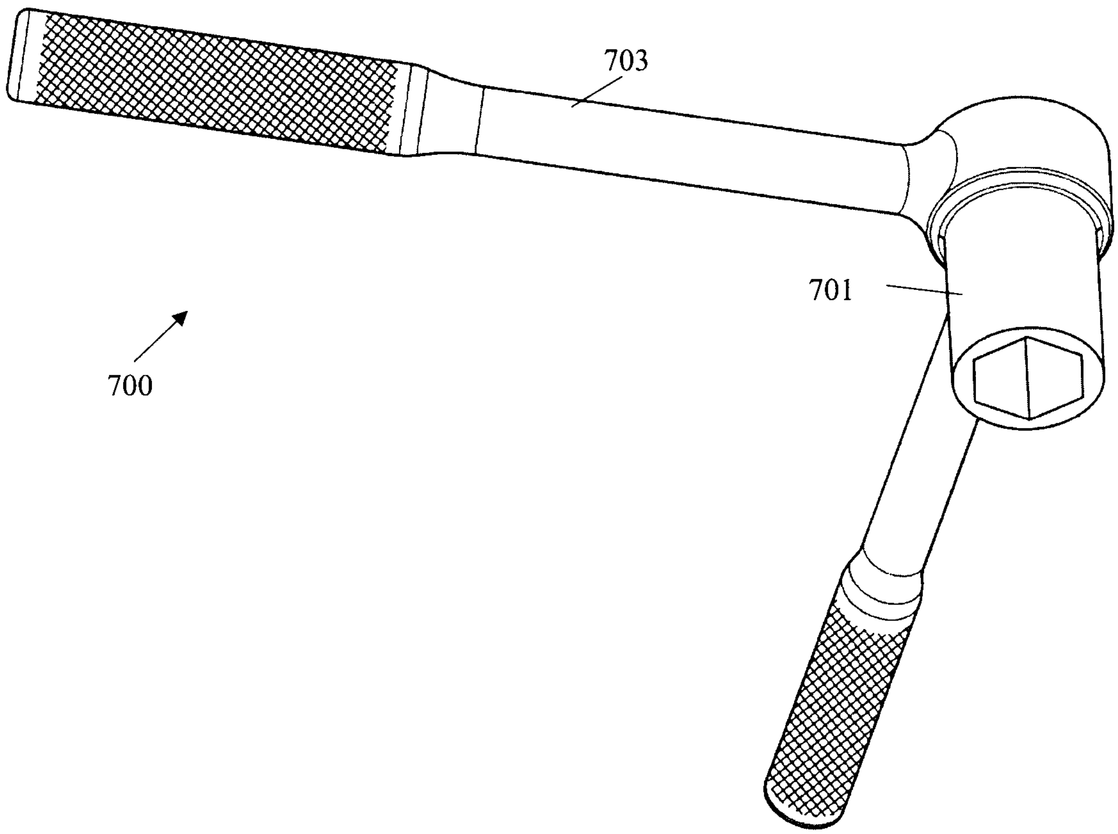
FIGS. 12A-B illustrate isometric views of other example configurations of a tool according to the present disclosure in the form of a wrench with a fixed, central, socket head disposed between first and second handle portions, a wrench with detachable, interchangeable, and central socket heads disposed between first and second handle portions, respectively.
Figure 12B:
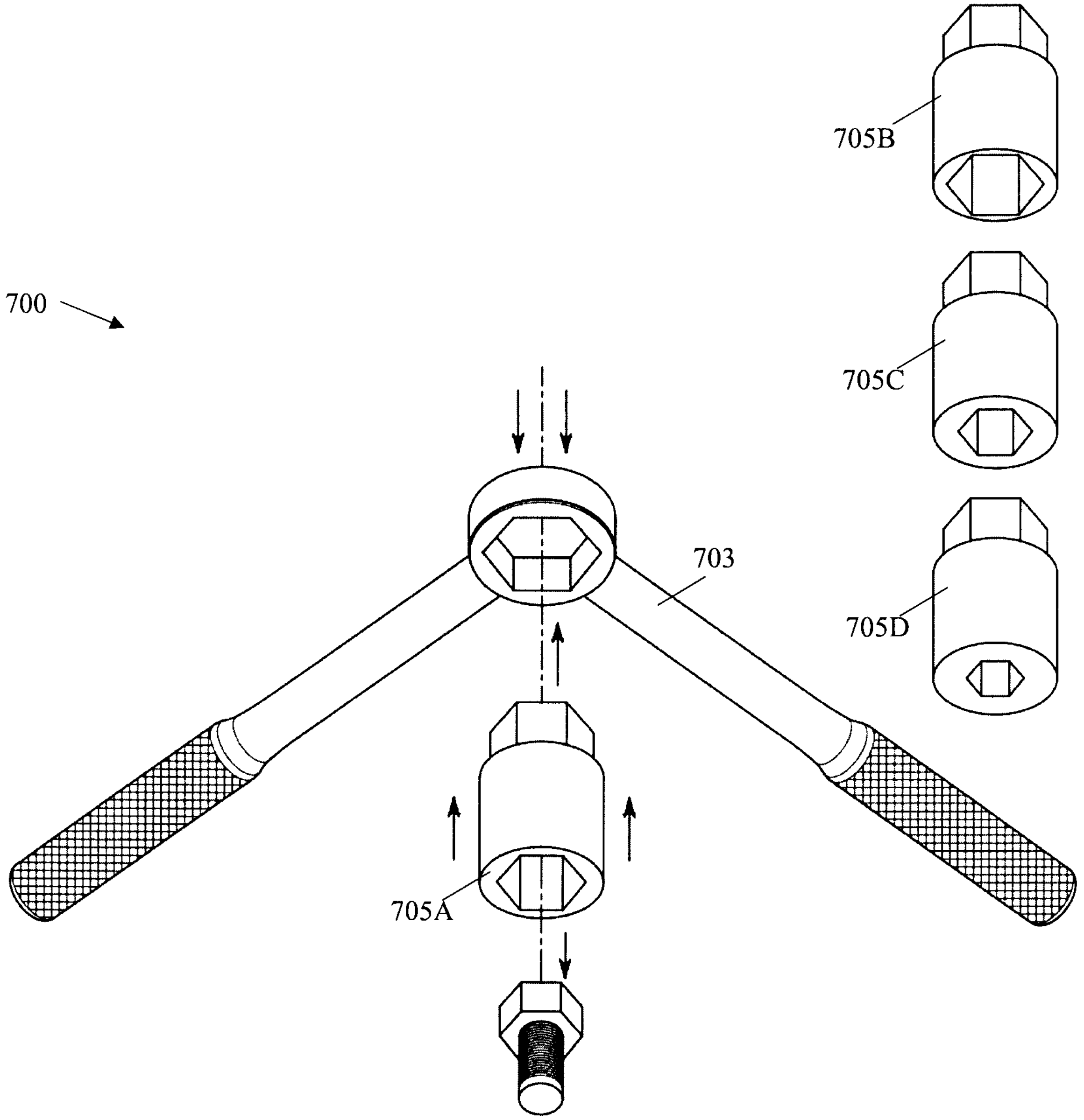

Referring now to FIGS. 12A-B, isometric views of other example configurations of a tool according to the present disclosure are illustrated in the form of, with respect to FIG. 12A, a wrench 700 with a fixed, central, socket head 701 disposed between first and second V-shaped handle portions 703. In FIG. 12B, the wrench 700 is illustrated with detachable, interchangeable, and central socket heads 705A-D positioned on the V-shaped first and second handle portions 703 with interchangeable connectivity and an array of socket sizes.

Figure 13:
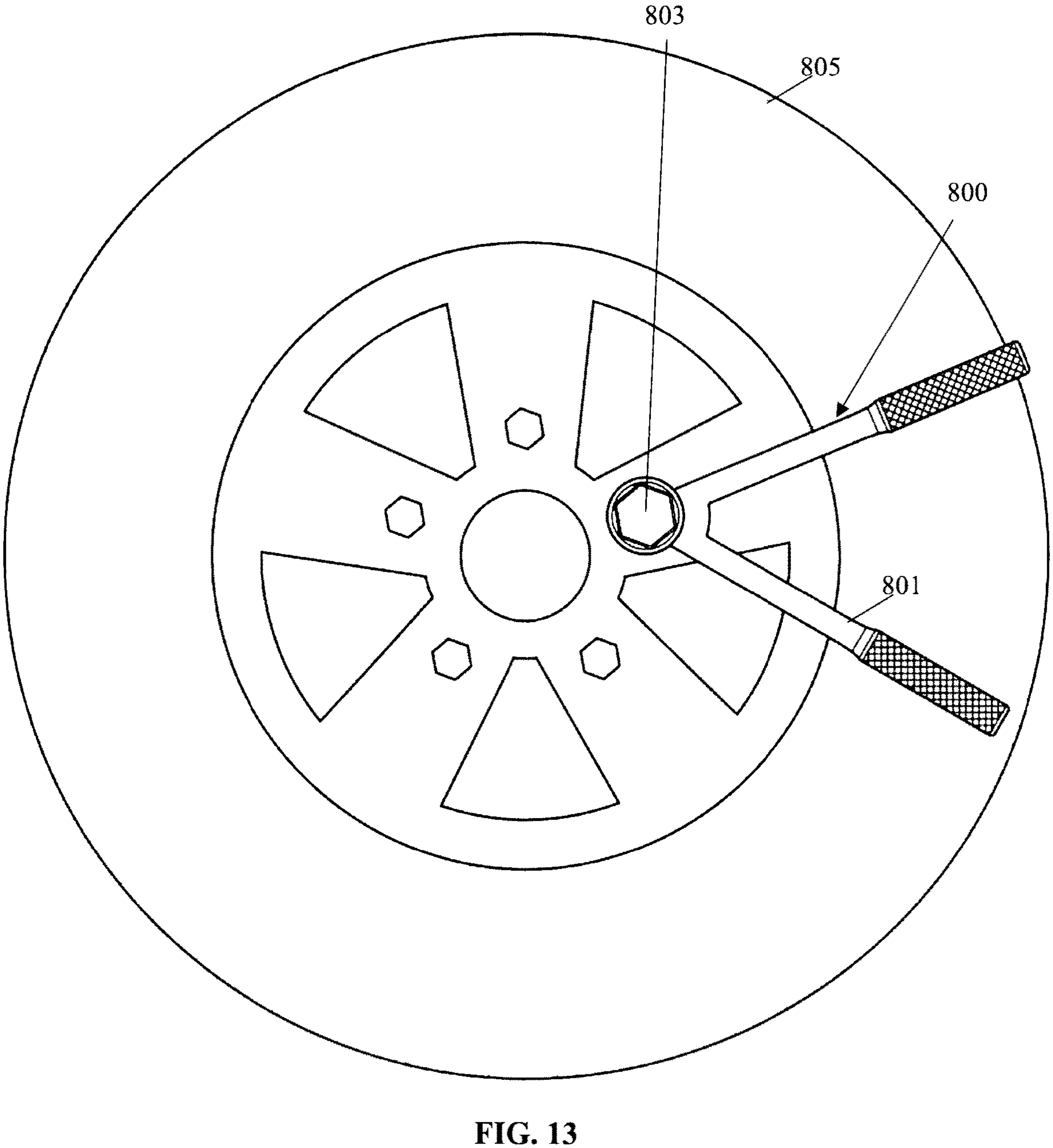
FIG. 13 illustrates an isometric view of a lug wrench with first and second handle portions applied to a lug nut on the wheel of a vehicle.

FIG. 13 illustrates an isometric view of a lug wrench 800 with V-shaped first and second handle portions 801 applied to a lug nut 803 on the wheel 805 of a vehicle (not shown).

Figure 14:
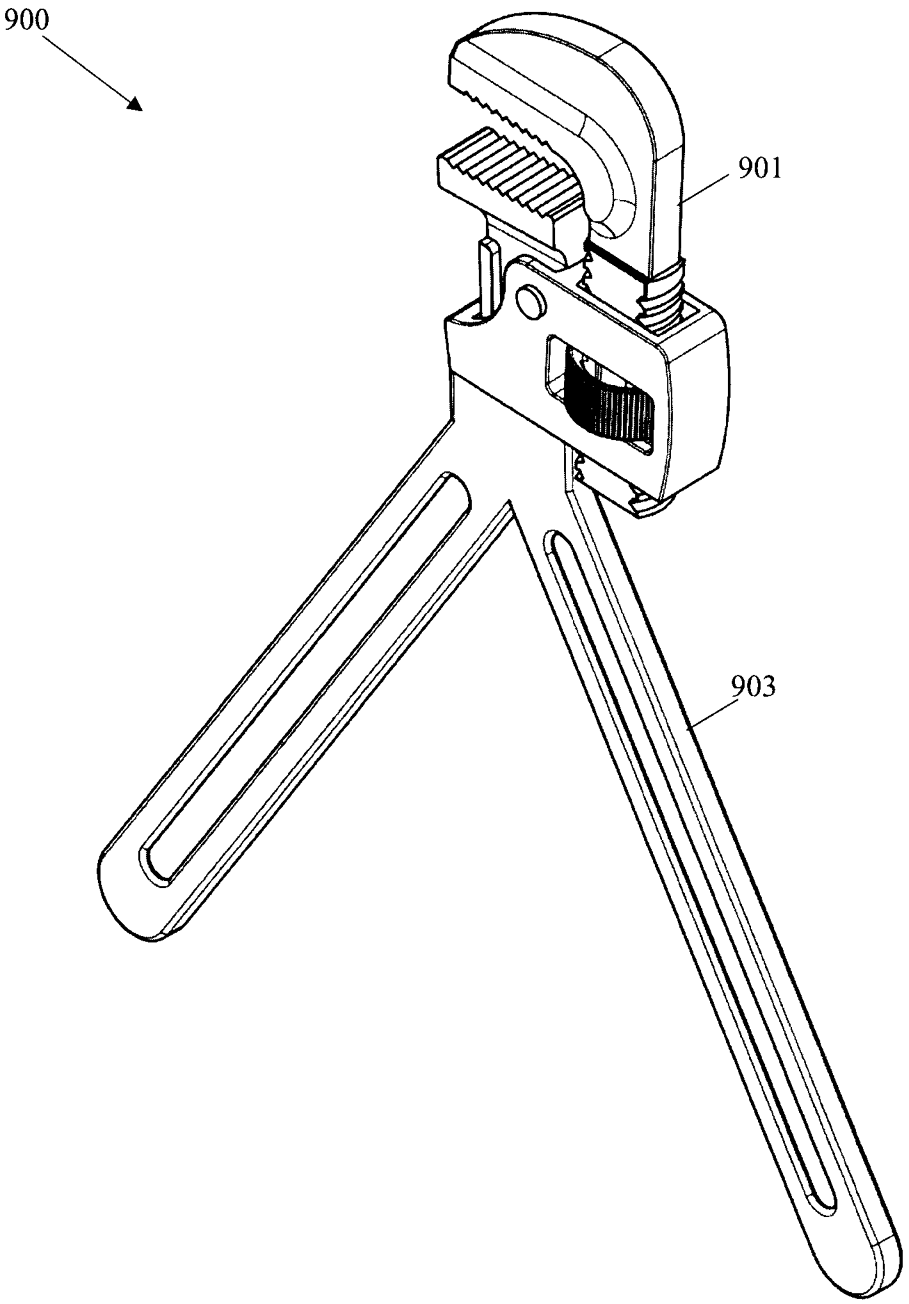
FIG. 14 illustrates an isometric view of another example configuration of a tool according to the present disclosure having a pipe wrench head disposed between first and second handle portions.

FIG. 14 illustrates an isometric view of another example configuration of a tool 900 according to the present disclosure having a pipe wrench head 901 positioned on top of V-shaped first and second handle portions 903.

Unless otherwise defined, all terms (including technical terms) used herein have the same meaning as commonly understood by one having ordinary skill in the art to which this invention belongs. It will be further understood that terms, such as those defined in commonly used dictionaries, should be interpreted as having a meaning that is consistent with their meaning in the context of the relevant art and the present disclosure and will not be interpreted in an idealized or overly formal sense unless expressly so defined herein.

The disclosed embodiments are illustrative, not restrictive. While specific configurations of the tool having a central toolhead have been described in a specific manner referring to the illustrated embodiments, it is understood that the present invention can be applied to a wide variety of solutions which fit within the scope and spirit of the claims. There are many alternative ways of implementing the invention.

It is to be understood that the embodiments of the invention herein described are merely illustrative of the application of the principles of the invention. Reference herein to details of the illustrated embodiments is not intended to limit the scope of the claims, which themselves recite those features regarded as essential to the invention.

What is claimed is:

1. A wrench having improved leverage properties, the wrench comprising: an angled V-shaped shaft consisting of a first handle portion and a second handle portion; and a central wrench head connected to the first handle portion and the second handle portion, wherein the first and second handle portions extend from the central wrench head diagonally along a shared plane and at angles similar or approximate to 45 degrees with respect to one another and the central wrench head is configured to be detachable, adjustable, or fixed to the first handle portion and/or the second handle portion.

2. The wrench according to claim 1, wherein the central wrench head is slidably adjustable with respect to the first handle portion and/or the second handle portion.

3. The wrench according to claim 1, wherein the first and second handle portions are retractably adjustable about an axis centered on the central wrench head and perpendicular to the shared plane of the first and second handle portions such that another angle between the first handle portion and second handle portion can be changed.

4. The wrench according to claim 1, wherein the central wrench head is detachably connected to the first handle portion and/or the second handle portion by an interchangeable connection.

5. The wrench according to claim 1, wherein the first handle portion further comprises a second wrench head attached to the first handle portion at an end distal from the connection to the central wrench head.

6. The wrench according to claim 1, wherein the second handle portion further comprises a third wrench head attached to the second handle portion at an end distal from the connection to the central wrench head.

7. The wrench according to claim 1, wherein the central wrench head protrudes outwardly from a central base portion.

8. The wrench according to claim 1, wherein the central wrench head is but it is not limited to only one of the following head types: a Pipe Wrench head, Chain Wrench head, Socket Wrench head, Torque Wrench head, Ratcheting Wrench head, Oil Filter Wrench head, Combination wrench head, Open-Ended Wrench head, Closed-Ended Wrench head, Crowfoot Wrench head, Pedal Wrench head, Monkey Wrench head, Pliers Wrench head, Strap Wrench head, Plumber's Wrench head, Tap Wrench head, Spud Wrench head, Alligator Wrench head, Basin Wrench head, Armorer's Wrench head, Dog Bone Wrench head, Drum Key Wrench head, Bung Wrench head, Fan Clutch Wrench head, Hammer Wrench head, Torx Key Wrench head, Cone Wrench head, Garbage Disposal Wrench head, Tension Wrench head, Spoke Wrench head, Spanner Wrench head, Nut Driver Wrench head, Box End Wrench head, Flare Nut Wrench head, Allen Wrench head, Bristol Wrench head, Ratcheting Box Wrench head, Flex wrench head, Socket Ratchet Wrench head, Lug Wrench head, or Spark Plug Wrench head.

9. The wrench according to claim 8, wherein the first handle portion further comprises a second wrench head attached to the first handle portion at an end distal from the connection to the central wrench head, the second wrench head comprising another one of the head types.

10. The wrench according to claim 8, wherein the second handle portion further comprises a third wrench head attached to the second handle portion at an end distal from the connection to the central wrench head, the third wrench head comprising another one of the head types.

11. The wrench according to claim 1, wherein the central wrench head has any of but not limited to only the following drive geometry types: flank drive, spline drive, 10-pointed drive, 12-pointed drive, or 6-pointed drive.

12. The wrench according to claim 1, wherein the wrench is but is not limited to only the following wrench types: Pipe Wrench, Chain Wrench, Socket Wrench, Torque Wrench, Ratcheting Wrench, Oil Filter Wrench, Combination Wrench, Adjustable Wrench, Impact Wrench, Crowfoot Wrench, Pedal Wrench, Monkey wrench, Pliers Wrench, Strap wrench, Plumber's Wrench, Tap Wrench, Spud Wrench, Alligator Wrench, Basin Wrench, Armorer's Wrench, Dog Bone Wrench, Drum Key, Bung Wrench, Fan Clutch Wrench, Hammer Wrench, Torx Key, Cone Wrench, Garbage Disposal Wrench, Tension Wrench, Spoke Wrench, Spanner Wrench, Nut Driver Wrench, Box End Wrench, Flare Nut Wrench, Allen Wrench, Bristol Wrench, Ratcheting Box Wrench, Flex wrench, Socket Ratchet Wrench, Lug Wrench, or Spark Plug Wrench.

13. The wrench according to claim 1, wherein the central wrench head is a ratcheting head or a ratcheting box wrench head.

14. The wrench according to claim 1, wherein the central wrench head is a 6-pointed drive.

15. The wrench according to claim 1, wherein the central wrench head protrudes perpendicularly to the shared plane of the first and second handle portions to allow a user to have room to fit the user's fingers underneath the wrench.

* * * * *